(12) United States Patent
Gardner et al.

(10) Patent No.: US 9,183,688 B2
(45) Date of Patent: Nov. 10, 2015

(54) CHARACTERISTIC VERIFICATION SYSTEM

(71) Applicant: LaserLock Technologies Inc., Washington, DC (US)

(72) Inventors: Norman A. Gardner, Bala Cynwyd, PA (US); Neil Alpert, Washington, DC (US); Paul Donfried, Richmond, MA (US)

(73) Assignee: LaserLock Technologies Inc., Washington, DC (US)

( * ) Notice: Subject to any disclaimer, the term of this patent is extended or adjusted under 35 U.S.C. 154(b) by 0 days.

(21) Appl. No.: 14/184,195

(22) Filed: Feb. 19, 2014

(65) Prior Publication Data

US 2014/0233842 A1 Aug. 21, 2014

Related U.S. Application Data

(60) Provisional application No. 61/766,372, filed on Feb. 19, 2013.

(51) Int. Cl.
| | |
|---|---|
| *G06K 9/00* | (2006.01) |
| *G07D 7/00* | (2006.01) |
| *G06K 19/00* | (2006.01) |
| *G07D 7/12* | (2006.01) |

(52) U.S. Cl.
CPC ........ *G07D 7/00* (2013.01); *G06K 19/00* (2013.01); *G07D 7/0046* (2013.01); *G07D 7/12* (2013.01)

(58) Field of Classification Search
None
See application file for complete search history.

(56) References Cited

U.S. PATENT DOCUMENTS

| | | | |
|---|---|---|---|
| 3,989,775 | A | 11/1976 | Jack et al. |
| 4,582,294 | A | 4/1986 | Fargo |
| 5,702,511 | A | 12/1997 | de Saint-Romain et al. |
| 5,851,279 | A | 12/1998 | Bäbler |
| 6,313,754 | B1 | 11/2001 | Shimomura et al. |
| 6,483,576 | B1 | 11/2002 | Gardner |
| 6,672,718 | B1 | 1/2004 | Stovold |
| 6,768,555 | B2 | 7/2004 | Chen et al. |
| 6,813,011 | B2 | 11/2004 | Gardner et al. |
| 6,851,617 | B2 | 2/2005 | Saint et al. |
| 6,861,012 | B2 | 3/2005 | Gardner et al. |
| 7,095,324 | B2 | 8/2006 | Conwell et al. |
| 7,417,550 | B2 | 8/2008 | Brown et al. |
| 7,661,600 | B2 | 2/2010 | Theodossiou et al. |
| 7,701,408 | B2 | 4/2010 | Bombay et al. |
| 7,939,239 | B2 | 5/2011 | Gardner et al. |
| 8,164,771 | B2 | 4/2012 | Hikichi et al. |
| 8,282,011 | B1 | 10/2012 | Skoine et al. |

(Continued)

OTHER PUBLICATIONS

Gardner et al., U.S. Office Action mailed May 21, 2010, directed to U.S. Appl. No. 10/596,028; 6 pages.

(Continued)

*Primary Examiner* — Randolph I Chu
(74) *Attorney, Agent, or Firm* — Morrison & Foerster LLP (57) ABSTRACT

Described is a characteristic verification system that includes security marks, devices, systems and methods that may be used to authenticate a material good and to provide strong brand protection. A device, such as a smartphone, that includes a software application, a camera and a light source, may be used to interrogate the security mark and connect to remote servers to authenticate the material good at varying levels of assurance. In addition to authenticating the good, the system may also authenticate the user and provide different information to different users and/or limit information that is provided unauthenticated users.

25 Claims, 5 Drawing Sheets

(56) References Cited

U.S. PATENT DOCUMENTS

| | | | |
|---|---|---|---|
| 8,551,683 B2 | 10/2013 | Gardner et al. | |
| 2002/0041372 A1* | 4/2002 | Gardner et al. | 356/71 |
| 2002/0146146 A1† | 10/2002 | Miolla | |
| 2003/0173406 A1 | 9/2003 | Bi et al. | |
| 2004/0000787 A1 | 1/2004 | Vig et al. | |
| 2004/0238623 A1 | 12/2004 | Asp | |
| 2005/0122593 A1 | 6/2005 | Johnson | |
| 2005/0161512 A1 | 7/2005 | Jones et al. | |
| 2005/0236481 A1 | 10/2005 | Gascoyne et al. | |
| 2005/0239207 A1 | 10/2005 | Gelbart | |
| 2007/0069895 A1 | 3/2007 | Koh | |
| 2007/0247317 A1 | 10/2007 | Farrell | |
| 2008/0116276 A1 | 5/2008 | Lo | |
| 2008/0138604 A1 | 6/2008 | Kenney et al. | |
| 2008/0149820 A1 | 6/2008 | Jordan et al. | |
| 2011/0180607 A1 | 7/2011 | Kennedy | |
| 2011/0261561 A1 | 10/2011 | Gardner et al. | |
| 2012/0138857 A1 | 6/2012 | Olm et al. | |
| 2012/0200389 A1 | 8/2012 | Solomon | |
| 2012/0211564 A1 | 8/2012 | Callegari et al. | |
| 2012/0251715 A1 | 10/2012 | Dalal et al. | |
| 2014/0016325 A1 | 1/2014 | Gardner et al. | |
| 2014/0263658 A1 | 9/2014 | Gardner et al. | |
| 2014/0270334 A1 | 9/2014 | Alpert et al. | |

OTHER PUBLICATIONS

Gardner et al., U.S. Office Action mailed Jan. 21, 2011, directed to U.S. Appl. No. 10/596,028; 8 pages.

Gardner et al., U.S. Office Action mailed Jan. 16, 2013, directed to U.S. Appl. No. 13/099,498; 6 pages.

International Search Report and Written Opinion mailed Aug. 9, 2005, directed to International Application No. PCT/US05/04579; 5 pages.

Communication pursuant to Article 94(3) EPC dated Mar. 22, 2013, directed to EP Application No. 05 713 481.9-1562; 5 pages.

Gardner et al., U.S. Office Action mailed Nov. 21, 2013, directed to U.S. Appl. No. 14/028,131; 10 pages.

Gardner et al., U.S. Office Action mailed Apr. 29, 2014, directed to U.S. Appl. No. 14/028,131; 10 pages.

Japanese Industrial Standards Committee, Divisional Council on Basic Items. (Mar. 1, 1990). "Classification of Fluorescent Lamps by Chromaticity and Colour Rendering Property," *Japanese Industrial Standard* (JIS) Z 9112-1990: 1-7.

Kamiya S. (1999). "Phosphors for lamps" Chapter 5—Section Two in *Phosphor Handbook*. Phosphor Research Society, CRC Press, pp. 367-373.

Gardner et al., U.S. Office Action mailed Sep. 11, 2014, directed to U.S. Appl. No. 14/212,757; 6 pages.

International Search Report and Written Opinion mailed Jun. 11, 2014, directed to International Application No. PCT/US2014/017196; 9 pages.

International Search Report and Written Opinion mailed Aug. 7, 2014, directed to International Application No. PCT/US14/29425; 12 pages.

International Search Report and Written Opinion mailed Aug. 4, 2014, directed to International Application No. PCT/US2014/23757; 9 pages.

AlpVision. (2012). "Cryptograph Digital Security Solution," retrieved on May 27, 2014. Retrieved from <http://www.alpvision.com/cryptoglyph-covert-marking.html>. 3 pages.

Gardner et al., U.S. Office Action mailed Feb. 18, 2015, directed to U.S. Appl. No. 14/212,757; 7 pages.

Alpert et al., U.S. Office Action mailed Jun. 23, 2015, directed to U.S. Appl. No. 14/049,776; 14 pages.

\* cited by examiner
† cited by third party

CHARACTERISTIC VERIFICATION SYSTEM

CROSS-REFERENCE TO RELATED APPLICATIONS

This application claims the benefit of U.S. Provisional Application Ser. No. 61/766,372, filed Feb. 19, 2013, the entire contents of which are incorporated herein.

FIELD OF THE INVENTION

This invention relates to authentication for authenticating material goods. More particularly, the present invention relates to security marks, devices, systems and methods that may be used to authenticate a material good and to provide strong brand protection.

BACKGROUND OF THE INVENTION

Conventional anti-counterfeiting solutions, such as holograms, ultraviolet (UV) ink and radio frequency identification (RFID) are proving ineffective at thwarting counterfeiters. Counterfeiting of material goods is accelerating and now affects a variety of material goods including medicines, foods, semiconductors, retail goods, parts, and components used in the manufacture of military equipment, automobiles, etc. Most conventional anti-counterfeiting solutions, such as holograms, have themselves been counterfeited. The criminal producing the counterfeit product simply applies the counterfeit holograms to fully mimic the appearance of the authentic product.

In addition, conventional anti-counterfeiting solutions that rely on restricted knowledge as part of the security profile also have limitations. These solutions require specialized tools for inspection and authentication and can be compromised either by gaining access to the tool or compromising any individual with access to the tool.

SUMMARY OF THE INVENTION

Described are systems, devices, and methods for authenticating material goods. The systems can take advantage of the proliferation of computing devices that incorporate a digital camera and an artificial light source in order to authenticate goods using a covert security mark. The systems may use steganography and other cryptographic techniques in order to increase security, restrict knowledge, and improve the resiliency of the system. The system can also provide additional features by allowing for the authentication of a user performing the authentication, which improves the resiliency of the system and facilitates the presentation of richer information about the material good and its pedigree for appropriately authorized users of the system.

In addition to real-time authentication, the system can also establish, monitor and verify the pedigree through out the supply and demand chains for the entire lifecycle of the material goods.

An image capture device incorporating the camera and light source may include a specialized application that is used to capture specific characteristics included in the product and/or its packaging. These characteristics are then transmitted to a separate on-line service where cryptographic techniques are used to interpret and authenticate the characteristics. Based on the identity of the user performing the authentication of the material good, certain information is passed back to the image capture device and presented to the user.

Some embodiments include methods of authenticating a material good by illuminating a security mark associated with a material good using a light source of an image capture device, wherein the security mark is not visible to the human eye; capturing an image of the security mark associated with the material good using a camera of the image capture device; transmitting the image of the security mark to a characteristic verification system; and receiving from the characteristic verification system information concerning the authenticity of the material good.

The security mark may be viewed in a display of the image capture device. The light source of the image capture device may include an LED. The security mark may include machine readable information. The machine readable information may be encrypted. In addition, a target area may be marked for aiming the light source and camera of the image capture device. The image capture device may be a mobile device. The mobile device may be a smartphone, laptop, or tablet PC.

The security mark may be affixed to the material good. The security mark may be affixed to packaging materials or shipping materials of the material good.

Some embodiments include methods of authenticating a material good by authenticating a user of a mobile device; illuminating a security mark associated with a material good using a light source of the mobile device, wherein the security mark is not visible to the human eye; capturing an image of the security mark associated with the material good using a camera of the mobile device; transmitting the image of the security mark to a characteristic verification system; and receiving from the characteristic verification system information concerning the authenticity of the material good.

In some embodiments, a user identity may be determined when authenticating the user and the information concerning the authenticity of the material good depends on the identity of the user. The user may be authenticated using a username/password, gesture, or image recognition. The user may also be authenticated using a fingerprint, a voice, a retina image, or facial recognition.

The security mark may be viewed in a display of the mobile device. The light source of the mobile device may include an LED. The security mark may include machine readable information. The machine readable information may be encrypted. In addition, a target area may be marked for aiming the light source and camera of the mobile device. The mobile device may be a smartphone, laptop, or tablet PC.

The security mark may be affixed to the material good. The security mark may be affixed to packaging materials or shipping materials of the material good.

Some embodiments include an image containing a security mark that is not visible to the human eye, but can be detected by an image capture device. The security mark may include machine readable information. The machine readable information may be encrypted.

Additional advantages of this invention will become readily apparent to those skilled in the art from the following detailed description. As will be realized, this invention is capable of other and different embodiments, and its details are capable of modifications in various obvious respects, all without departing from this invention. Accordingly, the examples and description are to be regarded as illustrative in nature and not as restrictive.

DETAILED DESCRIPTION OF THE INVENTION

Described is a characteristic verification system that includes security marks, devices, systems and methods that may be used to authenticate a material good and to provide strong brand protection. A device, such as a smartphone, that includes a software application, a camera, and a light source may be used to interrogate the security mark and connect to remote servers to authenticate the material good at varying levels of assurance. In addition to authenticating the good, the system may also authenticate the user and provide different information to different users and/or limit information that is provided unauthenticated users.

Figure 1:
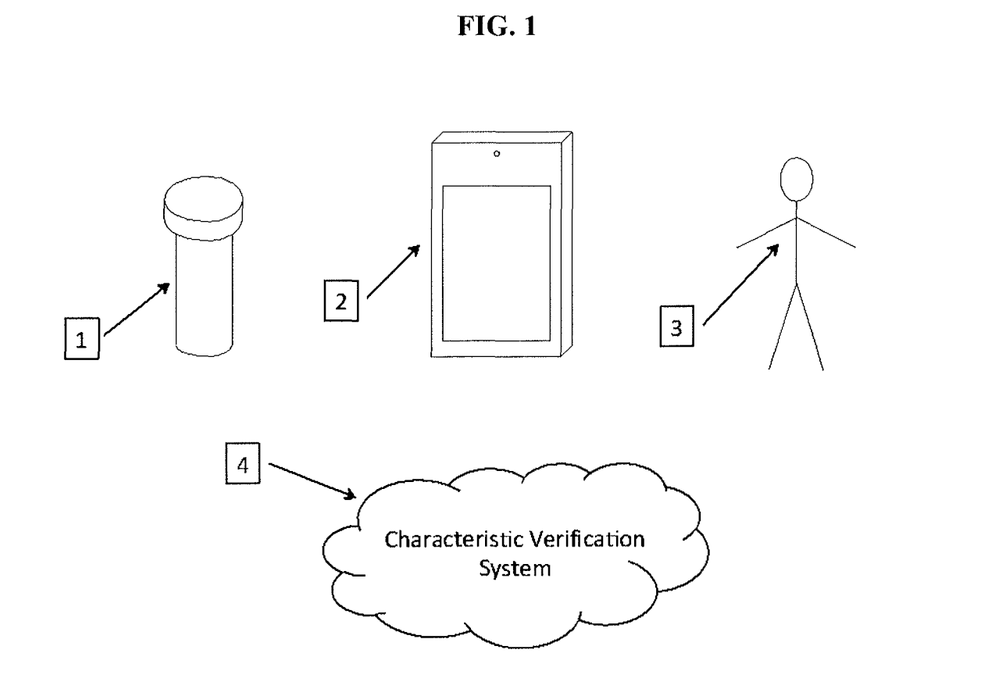
FIG. 1 illustrates the major components of one embodiment of a characteristic verification system.

FIG. 1 illustrates the major components of one embodiment of a characteristic verification system. A product 1 is being inspected for authenticity through the verification of certain characteristics. In this particular embodiment the product is a medicine bottle as might be used by a pharmaceutical manufacturer for packaging and distribution of proprietary medicines. Counterfeiting of pharmaceutical products is rampant and poses substantial safety, health, and economic risks to consumers, patients, health care professionals, the manufacturer, and anyone involved in their supply and demand chains. While this embodiment illustrates the product as medicine, this invention can be used with any material goods—paper, plastic, rubber, vinyl, metal, auto parts, retail products, currency, etc.

The product incorporates multiple characteristics intended to establish its authenticity; some of these are overt and are readily perceived by the human senses without requiring any special tools, knowledge or equipment. As an example, the manufacturers name and logo may be printed on the product. The product also contains multiple covert characteristics, such as the security mark described herein. The covert security marks do require special tools, equipment and/or knowledge to be inspected and authenticated. The security marks need not interfere with any other product characteristics and can be applied directly to the product itself, or to the packaging and/or shipping materials.

In FIG. 1 a mobile device 2 is illustrated. A user 3 can use the mobile device 2 to authenticate a product 1. The mobile device incorporates software that is part of the system, to capture authentication information about the user and the product. The mobile includes a camera and specialized light source, such as a LED light. The mobile device is configured to communicate with a characteristic verification system 4. In addition to interfaces for the mobile device 2, the characteristic verification system may also include additional external interfaces, for example, to systems maintained by product manufactures and entities within the product's supply chain.

Following is additional information on components within the characteristic verification system.

Security Marks

The system and security marks may utilize ISO 12931 compliant overt and covert characteristics. The security marks may be applied directly to the material good, or to packaging or shipping materials associated with the material goods.

The security mark may be partially or entirely invisible to the human eye, under typical ambient lighting conditions. For example, the mark may be formed using ink that is not visible when exposed to incandescent lighting, and/or fluorescent lighting. In some embodiments, the mark may be designed to become visible when exposed to a light source on an image capture device, such as a LED light source or other specialty light source that may be part of a mobile device. The wavelength of light that the security mark may become visible can be chosen depending upon the typical ambient lighting conditions and exposure of the light source of the mobile device. U.S. Pat. Nos. 7,939,239; 6,861,012; 6,813,011; 6,483,576; 6,672,718 describe some systems, methods and inks that may be used—the descriptions of these patents are hereby incorporated by reference in their entirety.

This is done by selecting specific materials used in the formulation of the ink. Different inks can be formulated for specific material goods based on the uses of those material goods, for instance whether they are typically used in hospitals or in outdoor environments. In some embodiments, the mark may be designed to remain non-obvious to the human eye when exposed to the light source on the mobile device. Even in environments where the ambient light is the same type as the image capture device, the light source on the image capture device may be focused in a specific direction, substantially brighter and typically much closer to the product. This difference in intensity can be used to hide or reveal specific characteristics.

The two limitations of the human eye that can be leveraged to insure characteristics remain invisible are spectral response and resolution. Characteristics can emit light at wavelengths either below or above the range the un-aided human eye can perceive—either ultra-violet or infra-red wavelengths. Characteristics can also be applied that emit light within the visible spectrum, however the characteristics can be so small relative to the surrounding visible characteristics that they are undetectable to the human eye without significant magnification which would require a specialized tool.

The security mark may be or include a cryptographic object. The camera and light source on a mobile device may be used to capture, and transmit an image of the security mark to an external Characteristic Verification System (CVS). The CVS then may use restricted knowledge to decrypt the security mark's cryptographic object. The cryptographic object can be used by the CVS to authenticate the product, and/or determine a unique product identifier linked to the product. For example, the cryptographic object can be any machine-readable information, such as a bar code, matrix code, characters that can be optically recognized, or an optically recognizable image. The machine-readable information may be encrypted using secret keys securely protected within the characteristic verification system.

Figure 2:
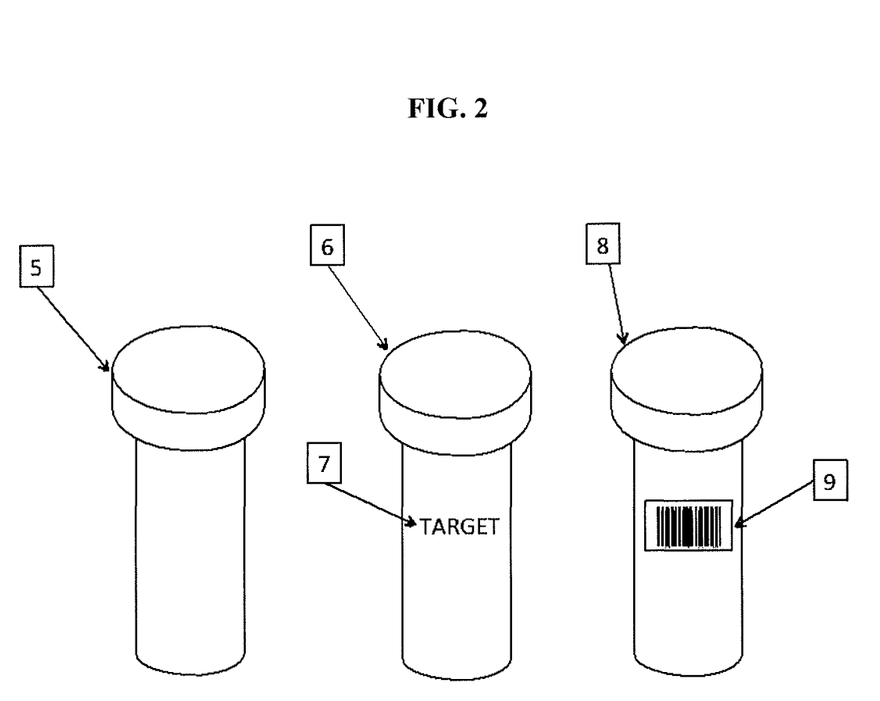
FIG. 2 illustrates a product including a security mark according to embodiments of the invention.

FIG. 2 illustrates a product including a security mark according to embodiments of the invention. A base product 5 incorporates multiple overt and covert characteristics such as a security mark. The covert security mark does not interfere with any other existing characteristics of the product and these other existing characteristics do not interfere with the security mark.

Reference number 6 illustrates the product under a condition where a specialized light source illuminates a 'target' area 7 on the product, which may allow the security mark to become visible to the human either directly or when viewed with an image capture device. Typically the security mark would be invisible to the human eye under natural light, however under illumination by a specialized light source and viewed through the mobile application it would be visible. The 'target' 7 provides the user an object to which the user can aim the camera.

Reference number 8 illustrates the product containing a security mark 9, such as a cryptographic characteristic. Typically, this characteristic would be invisible to the un-aided human eye and may also be invisible to the user utilizing the inspection device (the mobile device). In this embodiment the cryptographic characteristic is co-located with the 'target' 7, so when the user has pointed the camera at the 'target' an image can be captured that also reveals the cryptographic information, although this may not be obvious to the human eye.

In FIG. 2, the cryptographic characteristic is machine-readable information, which may or may not be visible to the un-aided human eye. In this particular embodiment a standard bar code is used; however any machine readable format can be used, including marks that require optical character recognition, image recognition, etc. The machine-readable information may be encrypted using secret keys securely protected within the characteristic verification system.

Some of the relevant parts of the characteristic verification system are further detailed below.

Image Capture Device

The image capture device includes a CPU and memory for running a software application, a camera and a light source. The image capture device also includes a communication interface configured to communicate with an external server device via the internet or other common or proprietary wired or wireless protocol. The image capture device may also include a display and a data entry portion. The display and data entry portion may be one and the same in the case of a touch screen or different, for example a display and a keyboard.

The image capture device may be a mobile device such as a smartphone, laptop, tablet PC, etc. However, the image capture device does not need to be a mobile device and can be a stationary device, such as a PC. Further, the image capture device may be a single device or multiple devices—for example a PC or mobile device connected to a camera and/or other peripherals.

Figure 3:
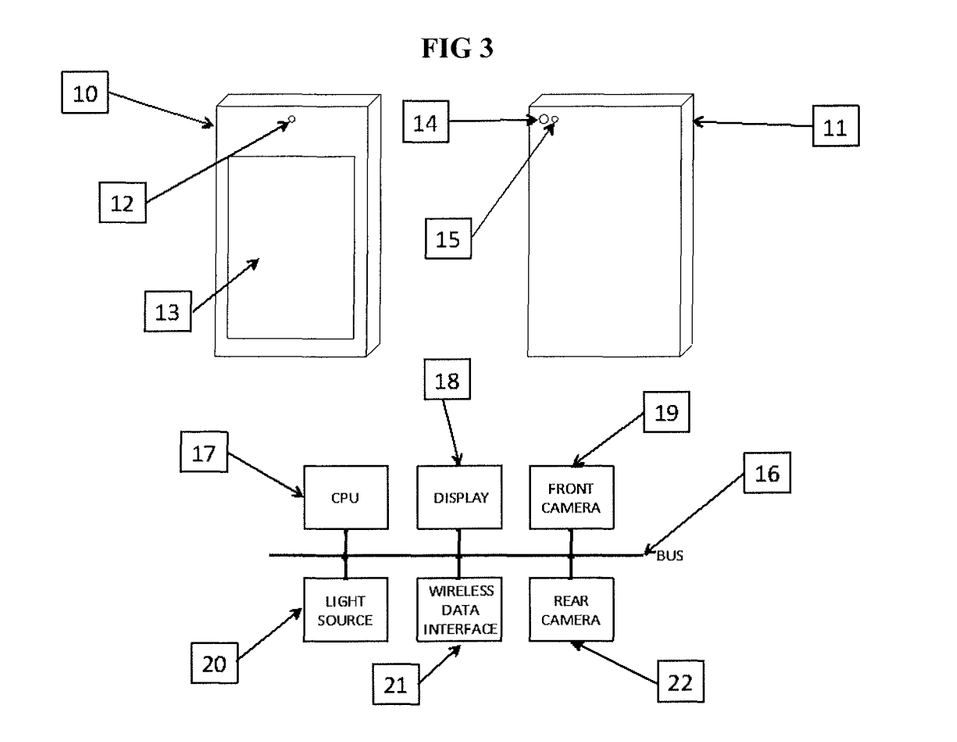
FIG. 3 illustrates an embodiment of a mobile device, such as a smartphone, that functions as an image capture device.

FIG. 3 illustrates an embodiment of a mobile device, such as a smartphone, that functions as an image capture device. In FIG. 3, the front of the mobile device 10 includes a front facing camera 12 and a display 13. The rear of the mobile device 11 includes a rear facing camera 14 and a specialized light source 15, such as an LED light. The mobile device also includes a bus 16 that interconnects the components. A central processing unit 17 is used to run mobile application software that is part of the mobile device and the security platform. The software can either come preloaded onto a memory of the device, such as a flash memory device, or can be downloaded or otherwise added onto a memory of the device at a later time. Display 18 is a touch-screen, also allowing for data entry. If the display is not a touch screen, the device must provide some other interface for data entry.

The mobile device includes a front facing camera 19. The front facing camera may be used to authenticate a user using the mobile application. For example, an image of the user may be taken and used for biometric facial recognition by the CVS to authenticate the user. In embodiments where other user authentication mechanisms are used, a front facing camera may not be used.

The mobile device includes a specialized light source. By specialized we refer to a light source other than natural light or thermal light such as incandescent light. Preferably, the light source is different than ambient lighting in which the security mark is typically displayed. This particular embodiment of the invention assumes a white LED (light emitting diode) light source, which is commonly used on mobile smartphones. However, other specialized light sources may be used. The light source is used with the rear facing camera 22 on the device. The rear facing camera 22 is used in conjunction with the light source to capture still images and/or video of the product. The mobile device also includes a wireless data interface 21, which is used to allow the mobile application software running on the mobile device to communicate with the external CVS.

Application

The application, such as a mobile application stored on a memory of a mobile device, can be used to authenticate a material good using the security mark described above. The mobile application uses the mobile device to capture an image of the security mark and transmit the captured image to the CVS.

The mobile application can be used to authenticate the user before performing any authentication of material goods. Authentication of the human user allows the system to provide different levels of authentication assurance and different types of authentication information. For example, this may allow the system to provide different information to different users, provide different information to authenticated users than non-authenticated users and/or only provide information to authenticated users. For simplicity, the presented embodiment of the invention assumes the end user will be authenticated; however that is not a requirement of the invention, it merely allows for illustrate some of the more advanced benefits that can be derived from using user authentication. In some embodiments, the system may support anonymous use, in which case no user authentication is required. The software application may utilize an open architecture that can support a variety of authentication mechanisms and combinations of human authentication mechanisms, such as:

Username/Password, gestures, image recognition, etc.
Physical Tokens—Smart Cards, OTP devices, etc.
Biometrics—fingerprint, voice, retina, facial recognition, etc.

As part of the user authentication process, contextual information may also be captured by the mobile application. Examples include an image of the user, a date/time stamp, geo-location coordinates, network information, etc.

Once the system has authenticated the user, the mobile application allows the user to capture an image of the concealed writing characteristic. The mobile device light source may be used to excite a mark which is not visible by the human eye. Once the user aligns this mark within a target area the mobile app confirms the image has been successfully captured.

The mobile application then securely transmits the image to the Characteristic Verification System (CVS).

Figure 4:
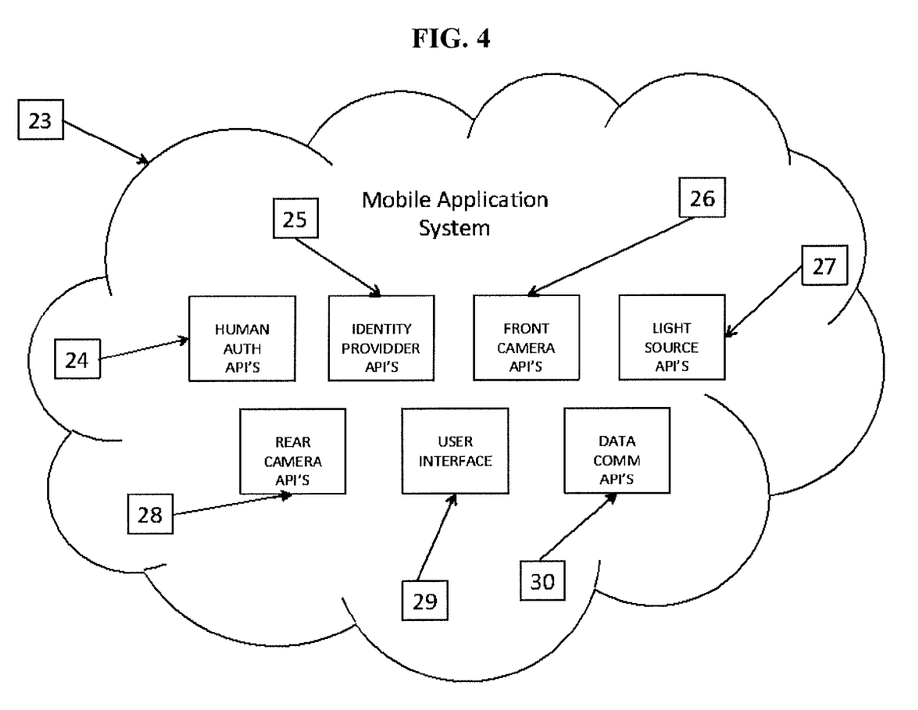
FIG. 4 illustrates the major components of an embodiment of a mobile application system.

FIG. 4 illustrates the major components of a mobile application system. A mobile application system 23 is software that runs on the mobile device platform and is stored on a memory of the mobile device. This embodiment of the invention assumes the mobile application system will run on a variety of devices including tablets, phones, personal digital assistants, etc. from different manufacturers. Different applications may be used for different platforms. While the functionality will remain the same for different platforms the application may need to be written in multiple languages to support different manufactures platforms. The application system includes API's 24 (application programming interfaces) for authenticating a user. While this embodiment of the invention uses biometric facial recognition as the authentication mechanism, the software may incorporate an open architecture and can implement industry standard protocols so that any available authentication mechanisms can be used. These API's are responsible for determining the identity of the user.

The application system also includes API's 25 for communicating with external identity providers. While this embodiment of the invention illustrates the use of external identity providers the invention works equally well with an internal identity provider to the characteristic verification system. An identity provider is responsible for upfront identity proofing of the user, registering one or more electronic credentials with the users and responding to electronic authentication requests where the registered credentials are used to confirm the authenticity of the user.

API's 26 are for controlling the front facing camera to capture both still images and/or video of the users to be used in authenticating the user with an identity provider. API's 27 are for controlling the light source, turning on, turning off, varying intensity and strobe effects. API's 28 are for controlling the rear facing camera, which is used, in conjunction with the light source to capture still images and/or video of the product.

API's 29 are the user interface which manages all interaction with the user including, but not limited to presentation of information, interrogation of the user, administration and targeting of the camera on the product. API's 30 are for data communication and are used by the mobile application to communicate with the characteristic verification system.

Characteristic Verification System (CVS)

The CVS is an external system that may include one or more computers and systems. After receiving the image of the security mark, the CVS is able to decrypt concealed writing within a cryptographic object of the security mark to reveal a unique product identifier.

This unique product identifier can be linked, for instance utilizing a database, to additional manufacturer information such as Serial number, date of manufacturer, expiry date, Batch number, Lot number, registered owner, etc. The CVS, based on the authenticated user's authorization role, specific to that product, determines what information to deliver back to the mobile app for presentation to the user. The CVS may support multiple levels of authorization, for example, Anonymous, Consumer, Commercial and Government, etc.

In addition to providing authentication information to the user of the image capture device, the CVS can also provide authentication transaction information back to the manufacturer or other member of the supply chain. This information can include, for example:
  Successful authentication transactions, identifying the user, date/time, location, image of authentic product, etc.
  Unsuccessful authentication transactions, identifying the user, date/time, location, image of counterfeit product, etc.
  Aborted and other unsuccessful transactions.

Figure 5:
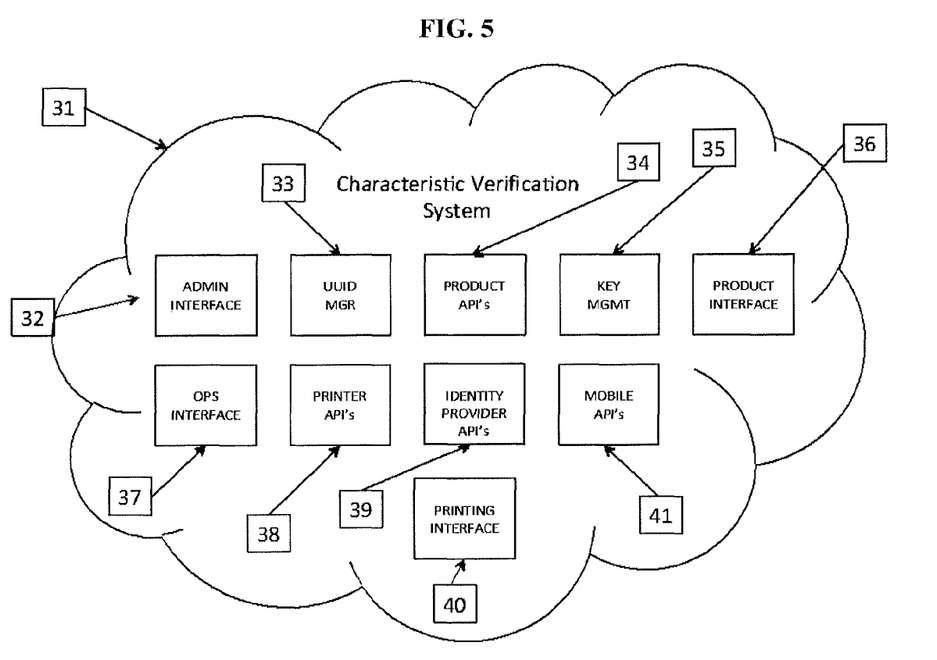
FIG. 5 illustrates the major components of a characteristic verification system (CVS).

FIG. 5 illustrates the major components of a characteristic verification system (CVS) 31. In this particular embodiment of the CVS, the CVS includes hardware and software that runs on Internet connected servers that can either be centralized or distributed.

The CVS includes administrative interface component 32. This component includes user interfaces, which allow administrators to administer all components of the system. Strict access controls limit administration to specific individuals and separation of duties is implemented consistent with security best practices. Complete logs and audit trails are maintained for all aspects of the system including all administrator actions.

The CVS includes a universal unique identifier (MID) manager 33. This component is responsible for instantiation, lookup, encryption and decryption of unique identifiers that can be associated with each individual product to be authenticated. One of the advantages of some embodiments of invention is that used as an anti-counterfeiting solution, the embodiments can uniquely authenticate individual products. For example, a manufacturer may produce 10,000 identical products. An invisible, unique characteristic(s) can be applied to each individual product as part of the standard manufacturing process, typically with no new equipment required. The UUID's is completely managed and maintained within the CVS. Un-encrypted forms of the UUID can only be made available to the manufacturer to whose products they have been assigned. In all other instances, the UUID may only exist as an encrypted object. The algorithm's used for encryption and decryption can be reversible and resilient, however any algorithm's that meet these criteria can be used including symmetric key, asymmetric key and public key infrastructure. Individual manufacturers could specify their preferred encryption algorithms.

Product API's 34 are used by the manufacturer and others to whom they delegate authority to access the CVS's services from computers that may be remote. The CVS may not maintain any product information other than the UUID. The UUID allows the manufacturer to create a link to the specific product information they maintain such as date of manufacture, expiration date, registered owned, batch #, lot #, etc. When the user requests authentication of a material good via the mobile device and the CVS has successfully completed the authentication, the manufacturer, based on the identity of the user, can determine what authentication information should be presented.

A key management component 35 is responsible for managing the cryptographic key material used for encryption and decryption of the UUID's. Both hardware and software is used to securely protect the key material. This may include tamper-proof and tamper-evident hardware within which the key material is generated and used. Key material may not exist outside of this specialized hardware.

Product user interfaces 36 are provided to allow the manufacturer's employees, and other whom they may delegate authority to, to directly access and manage the CVS settings and controls specific to the manufacturer and their diversity of products and characteristics. Different characteristics can be added, removed, enabled, disabled, etc.

Operational interfaces 37 are provided to allow production support and operations personnel to manage the system, respond to problems and correct deficiencies and anomalies. Access controls limit the use of these interfaces to specifically named individuals and separation of duties are implemented consistent with security best practices.

The printing API's 38 allow manufacturing systems to integrate with the CVS and interface with its services. Existing printers already in place in the manufacturing process can access the CVS in real-time to obtain characteristic information that can immediately be applied to the product. In this particular embodiment, the encrypted universal unique identifier (UUID), or a list of UUID's, can be obtained by the manufacturing systems so that, for instance, high speed ink jet printers, that are already used in the manufacturing process can be used to apply these characteristics. In other embodiments of the invention, a myriad of other uses for these API's can be implemented.

The identity provider (IDP) API's 39 are used during the authentication of the user using the mobile device. Internal, external, single or multiple IDP's may be supported. When the user operating the mobile device invokes the mobile application, an authentication protocol, specified by the IDP, may be utilized to identity the user. An anonymous mode may also be supported. This mode does not require authentication of the user. In anonymous mode, when an authentic product is being verified, the product API's are utilized to determine if the manufacturer supports this mode prior to any authentication information being presented to the user.

Printing user interfaces 40 are exposed to allow employees or delegates of the manufacturer to directly interact with the CVS and setup, administer and manage various services associated with support of real-time characteristic printing.

Mobile API's 41 support integration with the mobile application system. Mobile applications are registered to specific devices and authenticate to the CVS at the start of a session.

This invention will be better understood with reference to the following examples, which are intended to illustrate specific embodiments within the overall scope of the invention.

EXAMPLES

Example 1

A Consumer Succeeding in Authenticating a Retail Product

Alice receives her mail order discount medications. She is excited to find a source for the same name brand medications she used to buy locally, but at almost half of the cost. Her one concern is whether they are actually the same. The website claims they are the same 'DOZE-NOW' sleeping pills manufactured by 'ACME PHARMACEUTICALS' but she wants to make sure.

The 'ACME PHARMACEUTICALS' website indicates that all of their products incorporate special anti-counterfeiting technology which can be used by the consumer to verify the authenticity of the products. The 'ACME' website provides complete instructions on the steps needed to perform this verification.

First Alice is asked to enter either her email address or her phone number. ACME's website indicates either of these would be used to deliver a message to her smartphone with a URL for downloading an app. The app would allow Alice to verify the authenticity of any of ACME's products.

Alice enters her phone number and almost immediately her smart phone beeps, indicating a new text message. Alice opens the text message. It is from ACME and it includes a URL. When she clicks on the URL a message was displayed asking her if she wants to download an app called "INSPECTOR". She clicks 'Yes' and the app starts downloading to her smartphone. It takes about 10 seconds for the app to download and then it launches itself.

The 'INSPECTOR' app said it can operate in 2 modes—anonymous or authentic. In anonymous mode she does not need to identify herself, but can only authenticate 3 products a day. In authentic mode, she needs to register her identity, but then has no limits on the number of items she can authenticate. Alice decides to start in the anonymous mode.

Next, the app says that her camera window would appear and the light (flash) on her smart phone would turn on. She is supposed to find the "TARGET" word on the product and center it within the camera window. She is doubtful this is going to work as she cannot see the word 'TARGET' anywhere on medication. The app has a 'CONTINUE' button that she presses.

As soon as she presses the 'CONTINUE' button the flash on her phone lights up continuously and much to her amazement when she points it at the label on her medication—the word "TARGET" is visible in bright blue on her smart phone. She centers the smart phone and moves it closer so the word "TARGET" filling up the whole rectangle. Then the screen flashes and a message "Authenticating—please wait" appears. In about 5 seconds this was replaced by the message "Genuine DOZE-NOW produced by ACME PHARMACEUTICALS has been authenticated.

Example 2

A Consumer Failing in Authenticating a Retail Product

About a month later Alice receives her first medications from a new website she had found that is even less expensive than the first website. Naturally the first thing she does is to get her smart phone to verify the authenticity of the medicines.

This time, however, after the smartphone light comes on she cannot see the word "TARGET" on her smart phone. After about 30 seconds the app asks her if she is having trouble seeing the word "TARGET"—she clicks yes. The app tells her to try and get the entire label within the camera window and then click the "FINISH" button.

Alice gets the entire label centered in the camera window and then hits "FINISH". A message appears saying "Authenticating—please wait". In about 5 seconds, this message is replaced by another one saying "This product cannot be authenticated. It is highly likely it is counterfeit. May we provide this information to ACME PHARMACEUTICALS". Alice clicks OK and a new message is displayed "This information has been provided to ACME PHARMACEUTICALS, would you like a representative to call you and help replace the counterfeit product?". Alice hits OK and is relieved she did not take any of the new medication yet. In about a minute, her smart phone rings and when she answers she hears a friendly voice say "Hi I'm with Acme Pharmaceuticals and we're so glad you used the "INSPECTOR", you've haven't taken any of this medication yet have you?

Example 3

A Product Detailer for a Pharmaceutical Company Succeeding in Authenticating a Controlled Substance Medicine Bob, works for ACME PHARMACEUTICAL as a detailer. Part of his responsibilities, include verifying that controlled substance medications, which his company supplies are authentic and not near their expiration date.

Today, Bob is in WALBROWNS PHARMACY and one of the assistants behind the pharmacy counter is helping inspect ACME medications. The assistant hands him a bottle of the company's cholesterol reducing medication NOSITOR. Bob launches the INSPECTOR app and it immediately authenticates him, first via facial recognition using the smart phones front facing camera and second by requesting he enter his PIN. These authentication mechanisms were specified by Bob's employer ACME and are required every time he uses the inspector app. As soon as Bob successfully authenticates himself, the INSPECTOR camera window appears and the Flash light turns on.

Bob points the smart phone at the label on the bottle of NOSITOR and immediately the TARGET logo is visible on his smart phone. He lines it up in the camera window and instantly sees a message "Authenticating—please wait". In about 5 sec, this message is replaced with a window providing Bob with the following information:
Genuine NOSITOR authenticated
Expiration date=8/30/2012—OK
Batch #527-4658
Lot #7314
Distributor=Macwesson
Retailer=WALBROWNS PHARMACY Bob hands the medicine back to the Assistant, who hands him the next bottle.

Example 4

A Product Detailer for a Pharmaceutical Company Failing in Authenticating a Controlled Substance Medicine Bob is now at DON'S DISCOUNT DRUGS, a retailer that ACME has been having problems with. In Bob's last 2 visits to DON'S 44 bottles of counterfeit NOSITOR were found and an investigation is in progress.

Bob says hi to the Pharmacist and he starts handing Bob packages of NOSITOR to verify. Bob launches the INSPECTOR app and it immediately authenticates him, first via facial recognition using the smart phones front facing camera and second by requesting he enter his PIN. As soon as Bob successfully authenticates himself, the INSPECTOR camera window appears and the Flash light turns on.

Bob points the smart phone at the label on the bottle of NOSITOR and the first thing he notices is that no TARGET logo appears on his smart phone. Bob taps the screen and a MANUAL AUTHENTICATION button appears. Bob taps it and about 5 seconds later the following message appears:
Authentication FAILED—Image & Geolocation have been recorded
PLEASE SEIZE COUNTERFEIT PRODUCT Bob shows the screen to the Pharmacist and says "We have a problem".

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed as new and desired to be protected by Letters Patent of the United States is:

1. A method of authenticating a material good comprising:
    illuminating a security mark associated with a material good using a light source of an image capture device, wherein the security mark comprises:
        a first object that is invisible to the human eye but becomes visible to the human eye when illuminated by the light source of the image capture device, and
        a second object that is invisible to the human eye and remains invisible to the human eye when illuminated by the light source of the image capture device;
    capturing an image of the security mark associated with the material good using a camera of the image capture device;
    transmitting the image of the security mark to a characteristic verification system; and
    receiving from the characteristic verification system information concerning the authenticity of the material good.

2. The method of claim 1, wherein the security mark can be viewed in a display of the image capture device.

3. The method of claim 1, wherein the light source of the image capture device comprises an LED.

4. The method of claim 1, wherein the security mark comprises machine readable information.

5. The method of claim 4, wherein the machine readable information is encrypted.

6. The method of claim 1, wherein the first object is a target area for aiming the light source and camera of the image capture device.

7. The method of claim 1, wherein the image capture device is a mobile device.

8. The method of claim 7, wherein the mobile device is a smartphone, laptop, or tablet PC.

9. The method of claim 1, wherein the security mark is affixed to the material good.

10. The method of claim 1, wherein the security mark is affixed to packaging materials or shipping materials of the material good.

11. A method of authenticating a material good comprising:
    authenticating a user of a mobile device;
    illuminating a security mark associated with a material good using a light source of the mobile device, wherein the security mark comprises:
        a first object that is invisible to the human eye but becomes visible to the human eye when illuminated by the light source of the mobile device, and
        a second object that is invisible to the human eye and remains invisible to the human eye when illuminated by the light source of the mobile device;
    capturing an image of the security mark associated with the material good using a camera of the mobile device;
    transmitting the image of the security mark to a characteristic verification system; and
    receiving from the characteristic verification system information concerning the authenticity of the material good.

12. The method of claim 11, wherein a user identity is determined when authenticating the user and the information concerning the authenticity of the material good depends on the identity of the user.

13. The method of claim 11, wherein the user is authenticated using a username/password, gesture, or image recognition.

14. The method of claim 11, wherein the user is authenticated using a fingerprint, a voice, a retina image, or facial recognition.

15. The method of claim 11, wherein the security mark can be viewed in a display of the mobile device.

16. The method of claim 11, wherein the light source of the mobile device comprises an LED.

17. The method of claim 11, wherein the security mark comprises machine readable information.

18. The method of claim 17, wherein the machine readable information is encrypted.

19. The method of claim 11, wherein the first object is a target area for aiming the light source and camera of the mobile device.

20. The method of claim 11, wherein the mobile device is a smartphone, laptop, or tablet PC.

21. The method of claim 11, wherein the security mark is affixed to the material good.

22. The method of claim 11, wherein the security mark is affixed to packaging materials or shipping materials of the material good.

23. A substrate comprising
a security mark on the substrate, the security mark that is not visible to the human eye, but can be detected by an image capture device, wherein the security mark comprises a first object that is invisible to the human eye but becomes visible to the human eye when illuminated by a light source of the image capture device, and a second object that is invisible to the human eye and remains invisible to the human eye when illuminated by the light source of the image capture device.

24. The substrate of claim 23, wherein the security mark comprises machine readable information.

25. The substrate of claim 24, wherein the machine readable information is encrypted.

* * * * *